J. W. CHAPMAN.
PERCOLATING DEVICE.
APPLICATION FILED JUNE 29, 1911.
1,085,378.
Patented Jan. 27, 1914.
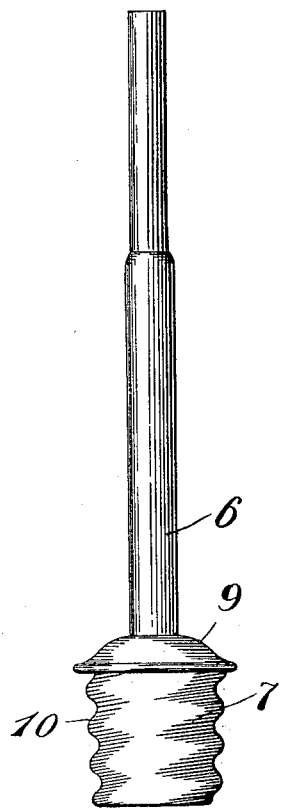
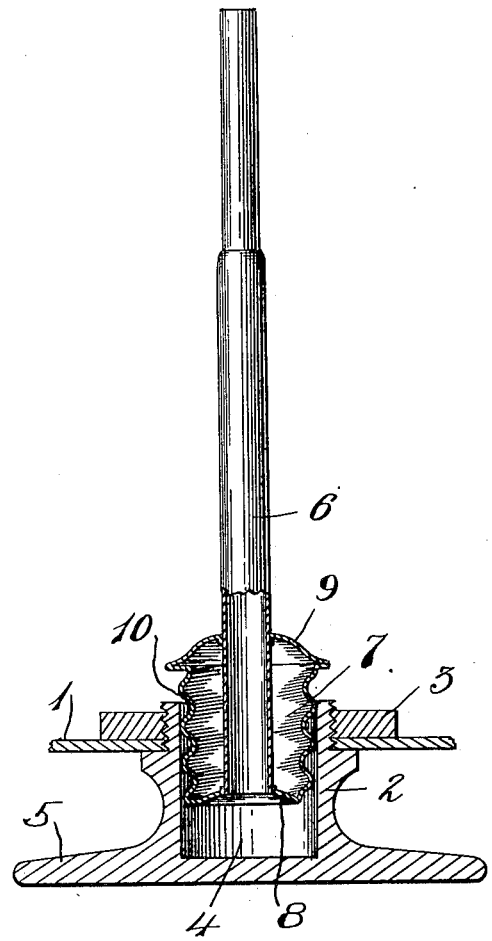

UNITED STATES PATENT OFFICE.

JAMES WEBSTER CHAPMAN, OF MERIDEN, CONNECTICUT, ASSIGNOR TO MANNING, BOWMAN & COMPANY, OF MERIDEN, CONNECTICUT, A CORPORATION OF CONNECTICUT.

PERCOLATING DEVICE.

1,085,378.  Specification of Letters Patent.  Patented Jan. 27, 1914.

Application filed June 29, 1911. Serial No. 635,916.

*To all whom it may concern:*

Be it known that I, JAMES W. CHAPMAN, a citizen of the United States, residing at Meriden, county of New Haven, State of Connecticut, have invented certain new and useful Improvements in Percolating Devices, of which the following is a full, clear, and exact description.

My invention relates to improvements in the percolating mechanism of so-called percolator coffee pots, and particularly to an improved construction of percolator tube and heating chamber whereby the liquid from the main body of the pot is admitted to the heating chamber through a tortuous passage, which, while admitting an adequate supply of liquid to the heating chamber, prevents the return of the liquid to the pot through said passage when the percolating operation is taking place.

A further object is to so arrange this passage as to secure preliminary heating of the liquid during transit from the main body of the pot to the heating chamber.

A further object is to provide for effective insulation of the contents of the pot from overheating due to the superheating of the heating chamber.

With these objects in view, the invention consists in the construction and arrangement of parts, a preferred embodiment of which is illustrated in the accompanying drawings, in which—

Figure 1 is a fragmentary sectional view of so much of a percolator pot and its heating chamber, together with the percolator tube, as is necessary to illustrate the invention. Fig. 2 is a view in elevation of the percolator tube embodying the invention.

Referring to Fig. 1, 1 indicates the bottom of a percolator coffee pot having a heating chamber 2 secured thereto by means of a nut 3. The heating chamber comprises the compartment 4 preferably formed in a casting depending from the bottom of the pot, said casting being expanded at the bottom into a disk 5 to present a greater heating surface. The heat of the disk 5 is conducted directly to the heating chamber 4. The percolator tube 6 has secured to the bottom thereof a hollow enlargement or cap comprising a sheet metal shell 7, having an inwardly turned flange 8 at the bottom secured to the extreme lower end of the tube 6 and having a cap member proper 9, to which the upper end of the shell 7 is attached, and which itself is attached to the percolating tube 6. The side wall of the shell 7 has a spiral groove or thread 10 preferably rolled therein, which, when the percolator tube is seated within the heating chamber, forms with the side wall of the chamber a tortuous passage to conduct the liquid from the main body of the pot to the heating chamber. As shown in Fig. 1, the heating chamber is of uniform diameter throughout from top to bottom, while the shell 7 is slightly cone-shape, so that when the shell and percolator tube are seated within the chamber the bottom of the shell stands sufficiently far above the bottom of the chamber to form a compartment of the necessary depth to secure the best percolating effect, and also the cap proper 9 of the shell is maintained sufficiently above the top of the heating chamber to leave a free passage to the tortuous groove in the shell from the interior of the pot. It is to be noted that the tube is not in any way attached to the heating chamber, but is freely seated therein so that it may be readily placed in position and may be readily removed for cleaning.

While I have herein described a particular form of my invention, it is to be understood that the same may be varied in the structure of details within the scope of the appended claims.

What I claim is:

1. A percolator pot comprising a main chamber, a heating chamber, a percolator tube having an enlargement at its lower end comprising a hollow shell, closed at top and bottom, to insulate the contents of the pot from the heating chamber, said shell having a groove formed in its side wall adapted when the percolator tube is seated in the heating chamber to form with the side wall of the heating chamber a tortuous passage extending from the body of the pot to the heating chamber.

2. In a percolator pot, a main chamber, a heating chamber, a percolator tube having an enlargement at its lower end comprising a hollow insulating shell closed at top and bottom to form a closure for the heating chamber and to insulate the contents of the pot from said chamber, said shell having a continuous groove formed in its side wall adapted when the tube is seated within the heating chamber to form with the side wall of the heating chamber a continuous tortuous passage extending from the body of the pot to the heating chamber.

3. In a percolator pot, a main chamber, a heating chamber, a percolator tube having an enlargement at its lower end comprising a hollow insulating shell closed at top and bottom to form a cover for the heating chamber and to insulate the contents of the pot from said heating chamber, said shell having a spiral groove formed in its side wall adapted, when said shell is seated within the chamber, to form with the side walls of said chamber a spiral passage extending from the body of the pot to said heating chamber.

4. In a percolator pot, a main chamber, a heating chamber, a percolator tube having an enlargement at its lower end decreasing in diameter from top to bottom, said enlargement comprising a hollow insulating shell closed at top and bottom adapted to be seated within said heating chamber and to extend into the same a distance determined by the diameters of the chamber and shell to leave a heating space below said shell, said shell having a continuous tortuous groove formed in its side wall adapted when the shell is seated within the chamber to form a tortuous passage extending from the body of the pot to said heating chamber.

JAMES WEBSTER CHAPMAN.

Witnesses:
GEORGE E. SAVAGE,
A. L. HUBBARD.

Copies of this patent may be obtained for five cents each, by addressing the "Commissioner of Patents, Washington, D. C."